United States Patent [19]

Borman et al.

[11] Patent Number: 4,530,878

[45] Date of Patent: Jul. 23, 1985

[54] ENHANCEMENT OF ETHYLENE-VINYL ACETATE ADHESION TO POLYESTER SHEET BY POST-REACTION

[75] Inventors: Willem F. H. Borman, Evansville, Ind.; John Semen, Baton Rouge, La.

[73] Assignee: General Electric Company, Pittsfield, Mass.

[21] Appl. No.: 372,671

[22] Filed: Apr. 28, 1982

[51] Int. Cl.$^3$ .................... B32B 27/30; B32B 27/36; B32B 7/10

[52] U.S. Cl. .............................. 428/334; 156/244.24; 156/334; 427/393.5; 428/347; 428/349; 428/480; 428/483; 428/420; 428/522; 428/523

[58] Field of Search .............. 428/483, 420, 480, 522, 428/523, 334, 347, 349; 427/393.5; 156/244.24, 497, 334

[56] References Cited

U.S. PATENT DOCUMENTS

| | | | |
|---|---|---|---|
| 3,959,567 | 5/1976 | Bradley | 428/483 |
| 4,218,510 | 8/1980 | Willson | 428/420 |
| 4,271,063 | 6/1981 | Borman | 260/40 R |
| 4,341,825 | 7/1982 | Keniski | 428/483 |

Primary Examiner—Ellis P. Robinson
Attorney, Agent, or Firm—Edward A. Hedman; William F. Mufatti; John W. Harbour

[57] ABSTRACT

The inter-layer adhesion of laminates comprised of alternating layers of thermoplastic polyester and ethylene-vinyl acetate copolymer is greatly enhanced by a method of treatment of the laminate with a stream of inert gas at elevated temperatures which is described. The treated articles in general exhibit a T-peel strength of 1 in. lb./in.$^2$ and greater, which is far in excess of the peel strengths typical of the untreated article.

14 Claims, No Drawings

ENHANCEMENT OF ETHYLENE-VINYL ACETATE ADHESION TO POLYESTER SHEET BY POST-REACTION

BACKGROUND OF THE INVENTION

High molecular weight linear polyesters and copolyesters of glycols and terephthalic or isophthalic acid have been available for a number of years. These are described by Whinfield, et al., in U.S. Pat. No. 2,465,319 and by Pengilly, U.S. Pat. No. 3,047,539. Such polyesters are especially useful to form films and fibers.

More recently, it has been disclosed by Borman and Campbell in U.S. Pat. No. 4,271,063, that if a high molecular weight polyester, a copolymer of ethylene and vinyl acetate and a filler are melt blended and then post-reacted by heating in the solid state, the resultant blend can be molded into articles having a number of improved properties.

It is known that the above mentioned polymeric materials can be used to form layered structures, or laminates, comprised of high molecular weight polyester sheets bonded together with ethylene-vinyl acetate copolymer. These can be prepared by compressing ethylene-vinyl acetate copolymer between sheets of polyester at an elevated temperature for brief periods. The finished article is particularly useful as packaging film. A drawback, however, is the relatively low degree of adhesion between the layers of the structure, with T-peel strengths as measured on an Instron tester of less than 0.5 in.lbs./in.$^2$ being typical.

INTRODUCTION TO THE INVENTION

The discovery has now been made that the adhesion of polymers of ethylene-vinyl acetate to polyester sheet material is markedly increased by subjecting the composite article to post-treatment in a stream of an inert gas at an elevated temperature above room temperature and below the melt temperature of the polymers.

By use of the post-treatment layered structures are produced in which the various layers are characterized by greatly improved adhesion, with T-peel strengths of 5.0 in.lbs./in.$^2$ and higher representative.

The invention thus comprises, in one aspect, a process of manufacture and, in another aspect, the resultant articles of manufacture.

DESCRIPTION OF THE INVENTION

The high molecular weight polyesters, preferably high molecular weight linear polyesters, used in the practice of the present invention are polymeric glycol esters of terephthalic acid and may include minor amounts of glycol esters of other difunctional acids, such as isophthalic, adipic, and the like. They are available commercially or can be prepared by known techniques, such as by the alcoholysis of esters of terephthalic acid with a glycol and subsequent polymerization, by heating glycols with the free acids or with halide derivatives thereof, and similar processes. These are described in U.S. Pat. Nos. 2,465,319 and 3,047,539, and elsewhere.

Although the glycol portion of the polyester can contain from two to ten carbon atoms, it is preferred that it contain from 2 to 4 carbon atoms in the form of linear methylene chains.

Preferred polyesters will be of the family consisting essentially of high molecular weight, polymeric glycol terephthalates having repeating units of the general formula:

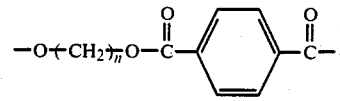

wherein n is a whole number of from two to four, and mixtures of such esters, including copolyesters of terephthalic and other difunctional acids like isophthalic, adipic and the like of up to about 15 mole percent of these other difunctional acid units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate). Mixtures of these high molecular weight polyesters are also contemplated herein and preferably a mixture of poly(1,4-butylene terephthalate) and poly(ethylene terephthalate).

Illustratively, high molecular weight poly(ethylene terephthalate) (PET) will have an intrinsic viscosity of at least about 0.4 deciliters/gram, while high molecular weight poly(1,4-butylene terephthalate) (PBT) will have an intrinsic viscosity of at least 0.7 deciliters/gram as measured in a 60:40 phenol tetrachloroethane mixture at 30° C. At intrinsic viscosities of at least about 0.6 deciliters/gram for PET and 0.9 deciliters/gram for PBT, there is a further enhancement in toughness of the present compositions.

Block copolyesters are also useful in the compositions of this invention. These are generally prepared by the reaction of terminally-reactive poly(butyleneterephthalate), preferably, low molecular weight, and a terminally-reactive copolyester or polyester in the presence of a catalyst for co-esterification, such as zinc acetate, manganese acetate, titanium esters, and the like. The terminal groups can comprise hydroxyl, carboxyl, carboalkoxy, and the like, including reactive derivatives thereof. After initial mixing, polymerization is carried out under standard conditions, e.g., 220° to 280° C., in a high vacuum, e.g., 0.1 to 2 mm Hg, to form the block copolymer of minimum randomization in terms of distribution of chain segments. These copolyesters are described in copending U.S. application Ser. No. 752,325, filed on Dec. 20, 1976, incorporated herein by reference. For example, these block copolyesters are derived from (i) a terminally-reactive poly(1,4-butylene terephthalate) and (ii) a terminally-reactive aromatic/aliphatic copolyester of a dicarboxylic acid selected from the group consisting of terephthalic acid, isophthalic acid, naphthalene dicarboxylic acids, phenyl indane dicarboxylic acid and compounds of the formula:

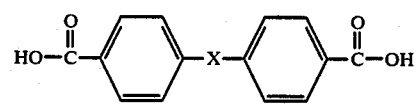

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain dihydric aliphatic glycols having from 4 to 10 carbon atoms in the chain, said copolyester having at least 10% of aliphatic units being derived from a dicarboxylic acid, or (iii) a terminally-reactive aliphatic polyester of a straight chain aliphatic dicarboxylic acid having 4 to 12 carbon atoms in the chain and a straight or branched chain aliphatic glycol, said blocks being connected by inter-terminal linkages consisting essentially of ester linkages.

The copolymers and terpolymers of ethylene and vinyl acetate useful in the practice of this invention may be derived from two or more monomers. Illustrative copolymers of ethylene and vinyl acetate contemplated herein include, for example, Alathon 3892, now referred to as Alathon 3194 (25% by weight vinyl acetate, 75% by weight ethylene), Alathon 3152 (15% by weight vinyl acetate, 85% by weight ethylene), Alathon 3180 (28% by weight vinyl acetate, 72% by weight ethylene), Vynathene EY903 (45% by weight vinyl acetate, 55% by weight ethylene) and Vynathene EY904 (52% by weight vinyl acetate and 48% by weight ethylene). The Alathons are products of the DuPont Chemical Co. and the Vynathenes are products of U.S.I. Chemicals. Among the terpolymers useful herein are included, for example, those prepared from ethylene, vinyl acetate and carbon monoxide (ELVALOY 741 or 742, sold by DuPont), ethylene, vinyl acetate and methacrylic acid and ethylene, vinyl acetate and acrylic acid (ELVAX 4260 and 4355 available from DuPont), and the like.

The sandwich laminate of polyester and ethylene-vinyl acetate copolymer may be prepared using any of the procedures well known to those skilled in the art. In one procedure, the laminate is produced by pressing pellets of ethylene-vinyl acetate copolymer between sheets of polyester, e.g. poly(alkylene terephthalate), ranging in thickness between 5 and 500 mils., in a hydraulic press of conventional design. The compression may be carried out at temperatures between 250° and 450° F., and pressures between 500 and 5000 psig., for a period of from 0.1 to 15 minutes. Exact conditions will depend on the thickness of the product layers and the nature of the polyester and vinylacetate copolymer.

After the laminate has been prepared, it is treated in accordance with the invention. In general, this will involve contacting the laminate with an inert gas, for example, nitrogen, at a temperature above room temperature, e.g., 25° C., and below the melt temperature of the polyester.

In greater detail, with reference to the preferred method, the treatment is conducted by suspending the laminate in a stream of the gas in an enclosed chamber, such as a fluid bed reactor, maintained at a temperature between 100° and 240° C., for a period sufficient to achieve a peel strength of at least 1 in.lb./in.$^2$, and generally 0.5 to 10 hours. The flow rate of the inert gas is not critical to the successful practice of the invention, and should only suffice to maintain adequate temperature control and heat transfer to the sample.

It will be observed that the described post-treatment results in a noticeable and usually very substantial enhancement of the degree of adhesion between the layers of the laminate. One way in which this can be evaluated conveniently is by measurement of the T-peel strength of specimens of the article before and after treatment.

Without wishing to be bound by any theory, it is believed that the increased adhesion between the layers is due to grafting of the ethylene-vinylacetate copolymer to the polyester surface via transesterification at the interface. This appears to have been confirmed by a test in which free (unbound) ethylene-vinyl acetate was dissolved away from test samples of untreated poly(1,4-butylene terephthalate) laminate and treated poly(1,4-butylene terephthalate) laminate (after delamination by the T-peel test) by immersion in p-xylene at room temperature for 24 hours, followed by repeated washing in p-xylene at 90° C. The resulting sheets, as well as virgin sheets of PBT and pellets of ethylenevinyl acetate (EVA) copolymer were placed in an $OsO_4$ vapor bath for 135–140 minutes and subsequently scanned for adsorbed osmium by SEM/XES. As found, $OsO_4$ stained the EVA pellets sufficiently for osmium to be detected but did not stain the PBT sheet. By using $OsO_4$ as an EVA selective stain on the PBT sheets obtained by xylene washing of the laminates, it was revealed that a xylene-insoluble layer of EVA remained on the post-reacted PBT laminate but no EVA remained on the unreacted PBT laminate.

The following examples illustrate the invention. These are intended only to show specific embodiments and are not to be construed as a limitation on the scope of the invention.

EXAMPLE

Laminates comprised of layers of poly(1,4-buylene terephthalate) alternating with layers of ethylene-vinyl acetate copolymers were prepared by pressing pellets of the copolymer (DuPont's Alathon 3194) between sheets of the poly(1,4-butylene terephthalate) for 10 minutes at 400° F. and 2500 psi. The T-peel strength as measured on an Instron machine (1 inch/min. crosshead speed, 0.5 inch/min. peel rate) was 0.2 in.lb./in.$^2$.

The same laminates were then post-reacted in accordance with the invention by suspension in a stream of nitrogen gas at 204° C. for 6 hours. The T-peel strength was 6.2 in.lb./in.$^2$.

X-ray energy spectroscopy of the $OsO_4$ stained laminates after immersion in xylene (a solvent for the EVA) showed the presence of bound EVA on the surface of the post-reacted PBT sheets, but no EVA in the as-pressed (non-post-reacted) specimens.

The above-mentioned patents and/or publications are incorporated herein by reference. Obviously, other modifications and variations are possible in light of the above disclosure. For instance, instead of poly(1,4-butylene terephthalate) sheet material, poly(ethylene terephthalate) or blends of poly(1,4-butylene terephthalate and poly(ethylene terephthalate) can be used. Processing conditions such as reaction time, reaction temperature, pressures, etc. may also be varied without loss of peel strength. It is to be understood, therefore, that changes may be made in the particular embodiments which are within the full intended scope of the invention defined in the appended claims.

We claim:

1. A multilayered laminate exhibiting improved interlaminar adhesion, said laminate comprising a layer of copolymer of ethylene and vinyl acetate between layers of poly(alkylene terephthalate), said copolymer being grafted by transesterification to said poly(alkylene terephthalate) layers along the interfaces formed therebetween.

2. An article according to claim 1, in which the poly(alkylene terephthalate) is poly(1,4-butylene terephthalate).

3. An article according to claim 1, in which the poly(alkylene terephthalate) is poly(ethylene terephthalate).

4. An article according to claim 1, in which the poly(alkylene terephthalate) is in the form of sheets having a thickness between 5 and 500 mils.

5. A process for the preparation of a multi-layer laminate exhibiting improved interlaminar adhesion, said process comprising:
   (a) forming a multilayered structure by providing a plurality of alternating layers comprising sheets or layers of high molecular weight linear polyester and layers formed of pellets of ethylene-vinyl acetate copolymer;
   (b) subjecting said multilayered structure to conditions of elevated temperature and pressure for a time sufficient to form a laminate; and
   (c) thereafter, post-reacting the laminate so formed by
      (i) suspending the laminate in a flow of an inert gas at a temperature between 100° C. and 240° C.; and
      (ii) maintaining the laminate under the conditions of step (c) (i) for a period of time sufficient to achieve a T-peel strength of at least 1 in.lb./in.$^2$ between the polyester layers and the ethylene-vinyl acetate copolymer layers.

6. A process as recited in claim 5, wherein in step (b) the multilayered structure is subjected to temperatures of between 250° F. and 450° F. and pressures of between 500 psig and 5,000 psig for a period of from 0.1 to 15 minutes to form the laminate.

7. A process as recited in claim 5, wherein in step (c) (ii) the laminate is maintained under the conditions of step (c) (i) for a period of from about 0.5 to 10 hours.

8. A process according to claim 5, in which the post-treatment is conducted for a period of time sufficient to achieve a T-peel strength of at least 5 in.lb./in.$^2$.

9. A process according to claim 5, in which the polyester is a poly(alkylene terephthalate).

10. A process according to claim 5, in which the polyester is poly(1,4-butylene terephthalate).

11. A process according to claim 5, in which the polyester is poly(ethylene terephthalate).

12. A process according to claim 5, in which the polyester is a blend of poly(1,4-butylene terephthalate) and poly(ethylene terephthalate).

13. A process according to claim 5, in which the inert gas is nitrogen.

14. A laminate prepared in accordance with the process or claim 5.

* * * * *